(12) United States Patent
Heise

(10) Patent No.: US 6,805,167 B2
(45) Date of Patent: Oct. 19, 2004

(54) FLUID CONDUIT

(75) Inventor: Lorne R. Heise, RR#2, Minden, ON (CA), K0M 2K0

(73) Assignee: Lorne R. Heise, Minden (CA)

( * ) Notice: Subject to any disclaimer, the term of this patent is extended or adjusted under 35 U.S.C. 154(b) by 0 days.

(21) Appl. No.: 10/271,988

(22) Filed: Oct. 17, 2002

(65) Prior Publication Data

US 2003/0079787 A1 May 1, 2003

Related U.S. Application Data

(60) Provisional application No. 60/329,512, filed on Oct. 17, 2001.

(51) Int. Cl.[7] .............................................. F16L 53/00
(52) U.S. Cl. ......................... 138/33; 138/32; 219/535; 137/341
(58) Field of Search .................... 138/33, 32; 137/341; 219/535

(56) References Cited

U.S. PATENT DOCUMENTS

| | | | | |
|---|---|---|---|---|
| 3,331,946 A | * | 7/1967 | Bilbro | 219/535 |
| 3,548,158 A | * | 12/1970 | McCaskill | 219/530 |
| 3,784,785 A | * | 1/1974 | Noland | 392/468 |
| 3,949,189 A | * | 4/1976 | Bilbro et al. | 392/468 |
| 3,971,416 A | * | 7/1976 | Johnson | 138/33 |
| 4,038,519 A | * | 7/1977 | Foucras | 392/472 |
| 4,152,577 A | * | 5/1979 | Leavines | 392/468 |
| 4,214,147 A | * | 7/1980 | Kraver | 392/468 |
| 4,218,607 A | * | 8/1980 | Noland | 392/468 |
| 4,874,925 A | | 10/1989 | Dickenson | 249/301 |
| 5,544,275 A | * | 8/1996 | Ebbing et al. | 392/480 |
| 6,131,617 A | * | 10/2000 | Pitzer et al. | 138/143 |
| 6,213,157 B1 | * | 4/2001 | Thiebaud et al. | 138/149 |

FOREIGN PATENT DOCUMENTS

CA  2019590  12/1994

* cited by examiner

*Primary Examiner*—Patrick Brinson
(74) *Attorney, Agent, or Firm*—John R. S. Orange; Santosh K. Chari; Blake, Cassels & Graydon LLP

(57) ABSTRACT

A fluid conduit has a peripheral wall defining a fluid passage extending along a longitudinal access. A heating element is located in contact with the peripheral wall and extending parallel to the longitudinal access. A jacket entrained about the peripheral wall and heating element maintains the heating element in contact with the peripheral wall.

9 Claims, 2 Drawing Sheets

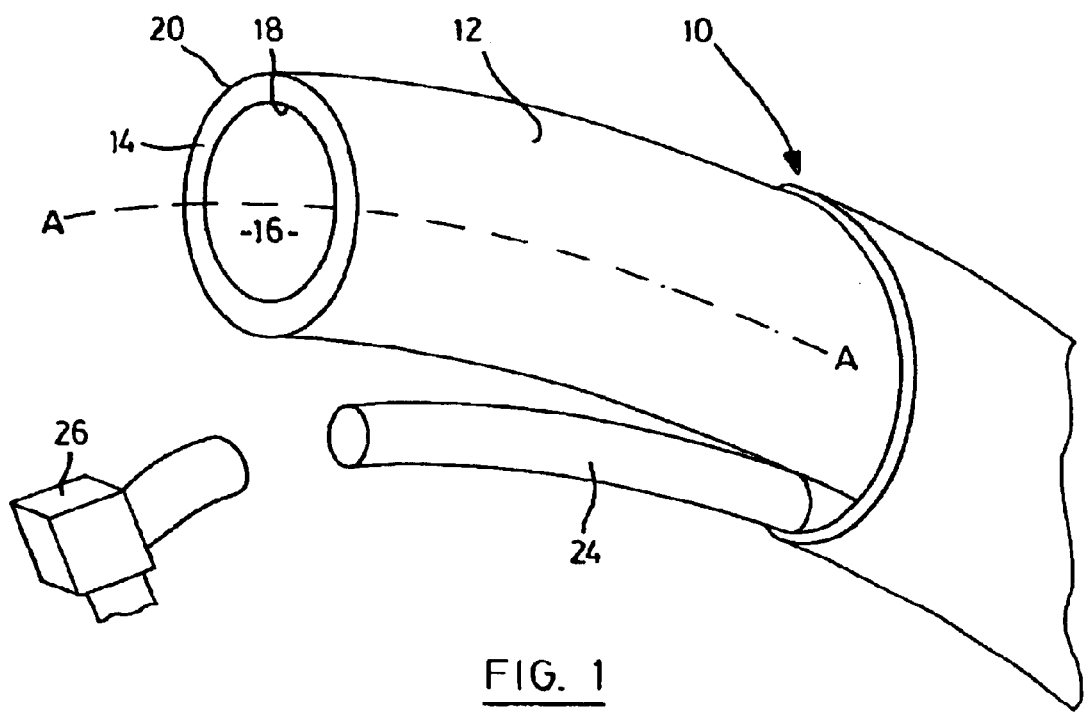
FIG. 1
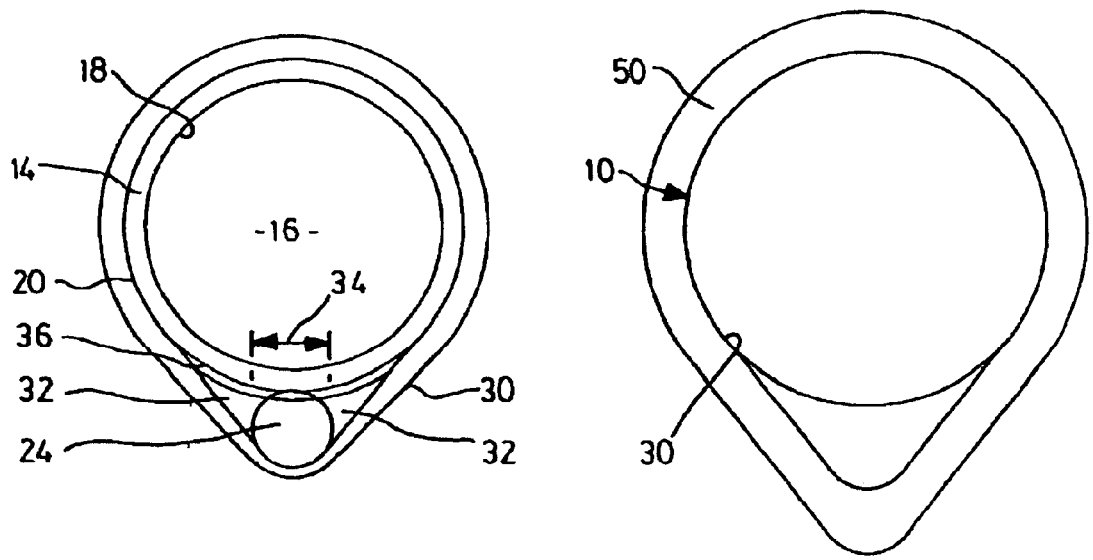
FIG. 2
FIG. 3

FLUID CONDUIT

This application claims priority from U.S. Application No. 60/329,512 filed on Oct. 17, 2001 the content of which is incorporated herein by reference.

FIELD OF THE INVENTION

The present invention relates to fluid conduits such as hoses and pipes.

BACKGROUND OF THE INVENTION

Fluid conduits are used in a wide variety of applications to convey fluids between different locations. Perhaps one of the widest uses is the provision of pipes to convey water to commercial and residential establishments but pipes are also used to convey other fluids such as fuel oils, gasoline or other chemical substances.

The conduits are often installed in relatively hostile environments in which the fluids conveyed can be subject to temperatures that makes handling of the fluids difficult. Typically, in water distribution systems, there is a danger that the ambient temperature will drop below freezing and result in a blockage or bursting of the distribution pipe. In areas where this is likely to occur, the pipe may be buried beneath the frost line determined for that region, which may be over one meter below the ground level. This is of course relatively expensive and inhibits access to the pipe for routine maintenance and inspection. Moreover in some environments, it is not practical to bury the conduit due to ground conditions and essentially the pipe must remain exposed on the ground.

In Canadian Patent 2,019,590, a system is described in which a self regulating electrical heating cable is installed within a pipe so that heat may be supplied to the water within the pipe to prevent freezing. This arrangement facilitates the use of insulation around the pipe to reduce energy consumption and has enjoyed wide spread commercial success.

In some installations it is not practical to install a heating cable within the pipe. If the conduit is intended to carry combustibles then it is preferable to separate the heating element from the fluid itself. In other environments, the pressure of the fluid within the conduit makes the use of the internal heating cable impractical.

It is well known to retrofit a heating cable to the outside of a pipe by wrapping the cables spirally about the pipe. However, this arrangement is relatively inefficient in that heat transfer depends upon the contact between the heating element and the outer surface of the pipe and this cannot be assured with a manual wrapping of the cable about the pipe. Moreover, the cable remains vulnerable to external forces that may damage the cable or present a safety risk.

It is therefore an object to the present invention to provide a fluid conduit in which the above disadvantages are obviated or mitigated.

SUMMARY OF THE INVENTION

In general terms, the present invention provides a fluid conduit having a peripheral wall defining a fluid passage extending along a longitudinal access, a heating element in contact with the peripheral wall and extending parallel to the longitudinal access and a jacket entrained about the peripheral wall and heating element to maintain the heating element in contact with the peripheral wall.

Preferably, the heating element is a smaller diameter than the fluid passage and a void is created between the jacket and peripheral wall.

As a further preference, an insulating sleeve is positioned over the jacket to inhibit heat transfer from the heating element.

BRIEF DESCRIPTION OF THE DRAWINGS

These and other features of the preferred embodiments of the invention will become more apparent in the following detailed description in which reference is made to the appended drawings wherein:

FIG. 1 is a perspective view of a fluid conduit with portions that are removed for clarity.

FIG. 2 is a view on the line 2—2 of FIG. 1.

FIG. 3 is a view similar to FIG. 2 with an insulated sleeve installed.

DESCRIPTION OF THE PREFERRED EMBODIMENTS

Figure 4:
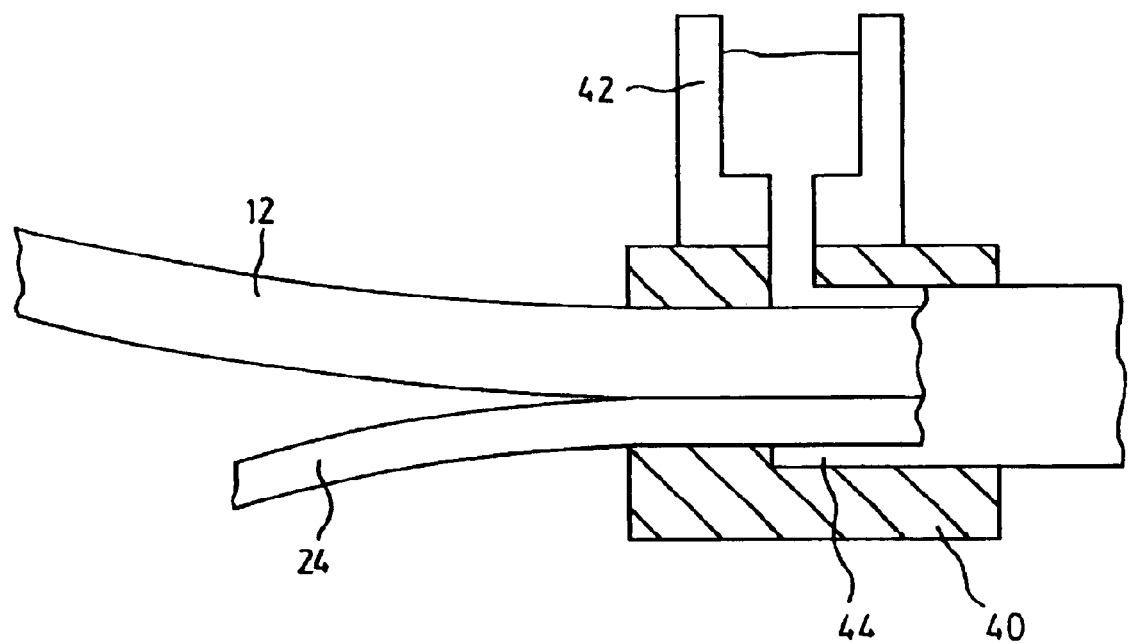
FIG. 4 is a schematic representation to the manner of making the conduit show in FIG. 1.

Referring therefore to FIG. 1, a fluid conduit 10 includes a pipe 12 having a continues peripheral wall 14 to define a fluid passageway 16. The passageway 16 is circular in cross section with a longitudinal axis indicated at A—A.

The peripheral wall 14 has inner and outer surfaces 18, 20 respectively and is formed from a suitable material such as PVC, polyethylene, a cross linked fluoropolymer referred to as PEX, ABS or other suitable material well known in the pipe manufacturing field. Typically the wall 14 is extruded as a continuous plastic material.

A heated cable 24 is located in abutment with the outer surface 20 of the peripheral wall 14 and extends parallel to the longitudinal axis of the fluid passageway 16. The cable 14 is a self regulating heater cable having a pair of heating elements interconnected by a carbon resistive element to produce a self regulated heating effect. Such cables are available from under the trade name Raychem, Dekoron, Nelson. The cable 24 terminates in an electrical plug 26 for connection to an electrical supply.

The cable 24 is held against the outer surface 20 of the wall 14 by a jacket 30. The jacket 30 is entrained about the outer surface 20 and the cable 24 so as to define a pair of voids 32 in the vertex between the jacket 30, cable 24 and wall 14. The jacket 30 is formed from a polyethylene either low, medium or high density, or other suitable material compatible the materials of the cable 24 and wall 14. The wall has a thickness of 2 mm and may range from 1 mm to 10 mm. After application, the jacket 30 is taut so as to force the cable 24 into abutment with the outer wall 20. As indicated by the zone 34, the pliability of the cable 24 causes a slight deformation at the abutment ensuring a substantial contact area between the cable 24 and the wall 14 over the length of the conduit 10.

To produce the conduit 10, the pipe 12 and cable 24 are fed into an extrusion die shown schematically in FIG. 4 at reference numeral 40. Feed stock for the jacket 30 is fed from hopper 42 into the extrusion cavity 44 to form the jacket 30. Continued movement of the pipe 12 and cable 24 conjointly through the die allows the jacket 30 to solidify and provide the construction of the conduit 10.

The finished conduit can be coiled depending on the dimensions of the pipe 12 or delivered in discrete lengths with suitable terminating and power connection kits applied to the cable 24 at the end of each length.

In operation, the conduit 12 can be installed on a surface or within shallow trenches. The jacket 30 protects the cable from external damage but does not impair the integrity of the structure of the pipe 12. At the same time, the extended contact area ensures that the heating effect of the cable 24 is maximised and distributed to the fluid within the pipe 12. The voids 32 provide additional area in which heat can be conducted into the surface of the pipe through air contained within the void to improve the efficiency.

As shown in FIG. 3, improved thermal efficiency can be obtained by applying a thermal sleeve 50 to the exterior of the jacket 30. The self regulating nature of the cable 24 ensures that overheating of the wall 14 does not occur and a normal operation and allows the heating to be applied on a selective basis as required in response to variations in the external temperature.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A fluid conduit having a peripheral wall defining a fluid passage extending along a longitudinal axis, a heating element in contact with an exterior surface of said peripheral wall and extending parallel to the longitudinal axis and a jacket entrained about the peripheral wall and heating element and extending in a substantially continuous manner along the length of said conduit to maintain the heating element in substantially continuous contact with the peripheral wall over the axial extent of said jacket, said heating element having a smaller diameter than the fluid passage and said jacket being said peripheral wall and heating element and sufficiently being taut to force said heating element into abutment with said exterior surface along the length of the conduit to provide substantially continuous contact between said heating element and said peripheral wall and thereby create a pair of enclosed voids between the jacket and peripheral wall on opposite sides of said heating element that extend axially along said conduit over the length of said conduit.

2. A fluid conduit according to claim 1 wherein an insulating sleeve is positioned over said jacket to inhibit heat transfer from the heating element.

3. A fluid conduit according to claim 1 wherein said jacket has a wall thickness of between one and ten millimeters.

4. A fluid conduit according to claim 3 wherein said wall thickness is two millimeters.

5. A fluid conduit according to claim 1 wherein said heating element conforms to said peripheral wall over the area in which contact is established.

6. A fluid conduit according to claim 5 wherein each of said heating element and said fluid passage are circular in cross section.

7. A conduit according to claim 1 wherein said heating element is self regulating.

8. A method of forming a fluid conduit having a fluid passage and a heating element co-extensive therewith along a longitudinal axis, said method comprising the steps of feeding said fluid passage and said heating element in a direction parallel to said longitudinal axis into a common zone within an extrusion die and extruding a jacket about a peripheral wall of said passage and said heating element to maintain said element in contact with said peripheral wall of the fluid passage and parallel to said longitudinal axis.

9. A method according to claim 8 wherein said jacket is extruded from polyethylene.

\* \* \* \* \*